Oct. 23, 1956  N. KARPF  2,767,630
PHOTOGRAPHIC CAMERA
Filed Dec. 26, 1951

INVENTOR:
NIKOLAUS KARPF

United States Patent Office 2,767,630
Patented Oct. 23, 1956

2,767,630

PHOTOGRAPHIC CAMERA

Nikolaus Karpf, Munich, Germany

Application December 26, 1951, Serial No. 263,290

Claims priority, application Germany December 28, 1950

4 Claims. (Cl. 95—50)

In outdoor photography as well as in the studio, professional photographers sometimes need a camera which affords a considerable tilting of the lens mount and of the slide or film pack holder. The cameras of this type which have been developed up to date have only partly answered these requirements.

The invention refers to a camera support on which the different parts can be tilted to such an extent that it can hardly be further improved. It is, therefore, an object of this invention to provide means affording longitudinal and angular movements of the camera relative to a support by mounting the lens standard and the slide or film pack holder each on one of two Cardanic joints, which can, for their part, be moved on a rod-shaped base guide or element. A further object of the invention, especially for lenses with long focal distance, is to provide means facilitating between the lens standard and the carrier of the slide or film pack holder, at least one support for the bellows of the camera, which can also be moved along the rod-shaped base element.

Figure 1:
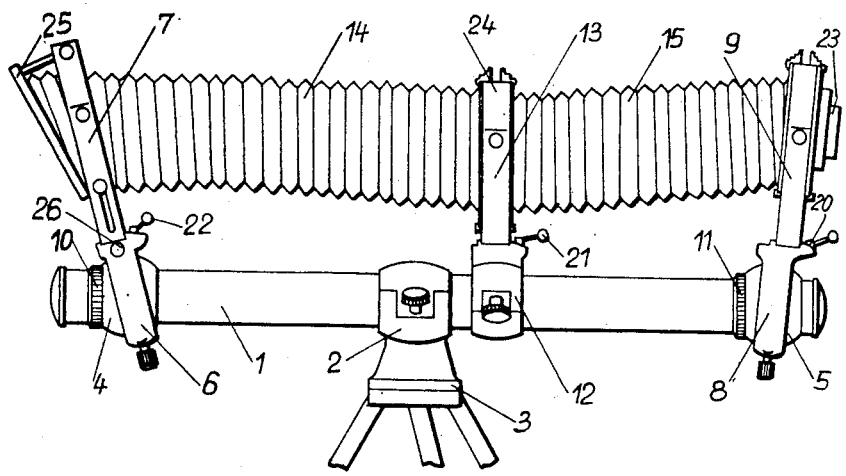
Figures 2, 3:
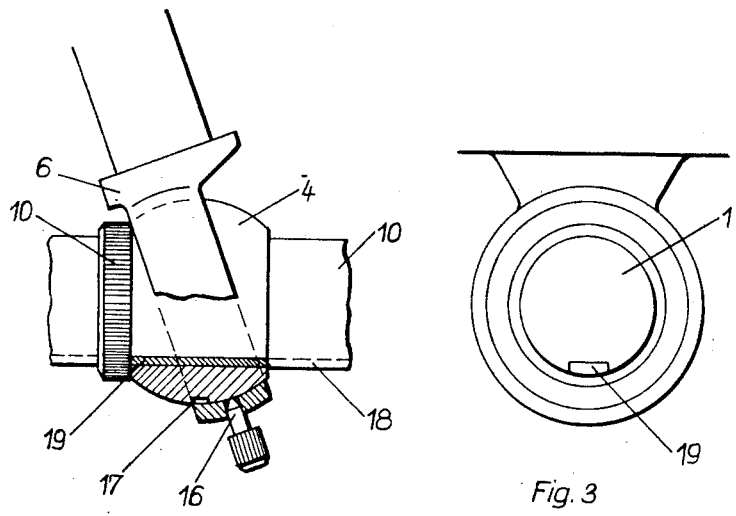

Further objects of the invention can be gathered from the following description and annexed drawing. In Fig. 1 of this drawing an embodiment of the invention is disclosed in the form of a support with a camera mounted thereon and shown in side elevation. Figs. 2 and 3 show details of the Cardanic construction employed in said support.

According to Fig. 1 the rod-shaped guide or base element 1 is held in the screw socket 2 of the top of the tripod 3. On the guide 1 the ball portions or spherical means 4 and 5 of Cardanic joints can be moved, of which on the one hand the pivoting frame socket 6 carries the slide or film pack holder 7 and on the other hand the pivoting frame socket 8 carries the lens standard 9. The spherical means 4 and 5 are coaxially movable to and on the guide 1 by means of a groove 18 and key 19 arrangement (Figs. 2 and 3 respectively). The ball parts 4 and 5 are provided with slots (not shown) and are fixed on the guide 1 by means of screw clamp joints 10 and 11 at any desired position of spherical parts 4 and 5. In the mount 12 the support 13 is fixed to the extended bellows 14 and 15 connected to the slide or film pack holder 7 on the one hand and to the lens standard 9 on the other hand. The mount 12 is also movable by means of a key (not shown, but similar to key 19) along the groove 18 of the guide 1. If necessary another support for accessory attachments to the camera, e. g. a diapositive stand, can be provided on the guide 1 in front of the lens standard 9. This can also be moved along the groove 18 in the guide 1 by means of a key (not shown).

The tilting of the frames 6 and 8 is carried out in a manner as can be seen in Fig. 2. At base position the adjusting pin 16 extends into a guide groove 17 positioned over the center axis, for instance of the ball portion 4, and ensures thereby the tilting of the slide or film pack holder 7 in a plane which is exactly perpendicular to the optical axis. The perfect fit of the ball portion 4 on the rod-shaped guide 1 is obtained, as already mentioned, by the longitudinal groove 18 and the key 19 (Fig. 3). The pivoting frame socket 6 can be fixed in a predetermined position in the plane perpendicular to the optical axis by a clamping screw (not shown). The pivoting frame socket 8 is tilted on the Cardanic ball portion 5 in the same manner as has been described for the tilting of the pivoting frame socket 6 on the Cardanic ball portion 4.

The lens standard 9, as also the frames 7 and 13 (Fig. 1), can be moved horizontally to the supports 8, 6 and 12, and fixed in the position desired by means of the excenter clamps 20, 22 and 21, indicated in Fig. 1. A further displacement of the lens 23, of the bellows attachment 24 and the slide or film pack holder 25 in a vertical direction can also be carried out in any already known manner. For better focusing the slide or film pack holder 25 with its frame 7 can be moved in a carriage guide of the pivoting frame socket 6 by means of a rack and pinion, in any known manner, in the direction of the optical axis. Lastly, the slide or film pack 25 can, as shown in Fig. 1, be tilted out of its holder.

With the use of a ball or Cardanic joint arranged at the screw socket 2 on the top of the tripod 3, the rod-shaped guide or base element 1 can be brought into any desired position. It can even, by this means, be pivoted into a vertical position.

Having thus described the invention, what is claimed as new and desired to be secured by Letters Patent, is:

1. In a photographic camera support; an elongated base element having opposite ends and an outer bearing surface, displaceable means having an inner surface seated on said outer surface of said base element and provided with an outer spherical surface extending beyond said outer surface of said base element, and means connectable with said camera and terminating in socket means provided with an inner surface complementary to said spherical surface of said displaceable means, said socket means encircling said spherical surface and being movable together with said displaceable means relative to the longitudinal axis of said base element, said connectable means with said socket means being further movable independently of and relative to said displaceable means to positions angularly inclined to the longitudinal axis of said base element and in a direction toward and away from said opposite ends of said elongated base element, said displaceable means and said socket means having respective axes intersecting with the longitudinal axis of said base element, which latter is adapted to be received in a sleeve mount for adjustment relative thereto.

2. In a support for a photographic camera; an elongated base element having opposite ends and an outer arcuate bearing surface, displaceable means having an inner surface seated on said outer surface of said base element and provided with an outer spherical surface extending beyond said outer surface of said base element, key and groove means provided on said inner surface of said displaceable means and said outer surface of said base element, respectively, for maintaining axial alignment therebetween, means connectable with said camera and terminating in socket means provided with an inner surface complementary to said spherical surface of said displaceable means, said socket means encircling said spherical surface and being movable together with said displaceable means relative to the longitudinal axis of said base element, said connectable means with said socket means being further movable independently of and relative to said displaceable means to positions angularly inclined to the longitudinal axis of said base element and directed toward one of said opposite ends of said elongated base element, and adjusting means cooperating with said socket means and said spherical surface of said displaceable means for maintaining said socket means at predetermined position with respect to said displaceable means, the axes of said displaceable means, of said socket means and of said base element intersecting in a common point, said base element being adapted to be received in a sleeve mount for adjustment thereto.

3. In a support for a photographic camera; an elongated base element having opposite ends and an outer bearing surface, displaceable means coaxially seated with the inner surface thereof on said outer surface of said base element and provided with an outer spherical surface extending beyond said outer surface of said base element, and socket means movable on said spherical surface and provided with an inner surface complementary to said spherical surface of said displaceable means, said socket means being further movable together with said displaceable means along the longitudinal axis of said base element, said socket means when moved independently of and relative to said displaceable means assuming a position angularly inclined to the longitudinal axis of said base element and directed toward one of said opposite ends of said elongated base element, said displaceable means and said socket means having respective axes passing through a common point of intersection with the longitudinal axis of said base element, said socket means being connectable with a part of a camera to support same.

4. Supporting means for a camera part relative to the camera bellows comprising an elongated first element having an arcuate outer surface, a second element having an inner surface fitted on the outer surface of said first element and provided with an outer spherical surface, a third element having an inner surface conformed to the outer spherical surface of said second element and swingable on the latter, said third element having an extension connectable to said camera part, said second element being coaxially disposed with and directly supported with said third element by said first element, means displaceably connecting said first element to said second element at their respective adjacent outer surface and inner surface and guiding said second element during displacement on said first element, and adjusting means extending through said third element for engagement with the outer spherical surface of said second element to thereby determine relative swinging positions of said third element to said second element and with respect to said first element, said third element being swingable in a plane passing through the center line thereof and intersecting with a plane passing through the longitudinal axis of said first element.

References Cited in the file of this patent

UNITED STATES PATENTS

| 365,435 | Freeman | June 28, 1887 |
| 1,035,977 | Lamb | Aug. 20, 1912 |
| 2,376,993 | Evans | May 29, 1945 |

FOREIGN PATENTS

| 428,602 | Germany | May 7, 1926 |
| 968,873 | France | May 10, 1950 |